United States Patent [19]

Mueller-Tamm et al.

[11] 4,154,700

[45] * May 15, 1979

[54] MANUFACTURE OF A TITANIUM-CONTAINING COMPONENT FOR CATALYSTS OF THE ZIEGLER-NATTA TYPE

[75] Inventors: Heinz Mueller-Tamm, Ludwigshafen; Hans Schick, Mannheim; James F. R. Jaggard, Ludwigshafen; Johann Nickl, Bad Durkheim, all of Fed. Rep. of Germany

[73] Assignee: BASF Aktiengesellschaft, Fed. Rep. of Germany

[ * ] Notice: The portion of the term of this patent subsequent to Oct. 17, 1995, has been disclaimed.

[21] Appl. No.: 855,876

[22] Filed: Nov. 30, 1977

[30] Foreign Application Priority Data

Dec. 24, 1976 [DE] Fed. Rep. of Germany ....... 2658936

[51] Int. Cl.² .............................................. C08F 4/64
[52] U.S. Cl. ........................... 252/429 B; 252/429 A; 526/142; 526/159
[58] Field of Search ....................... 252/429 B, 429 A

[56] References Cited

U.S. PATENT DOCUMENTS

| | | | |
|---|---|---|---|
| 3,032,510 | 5/1962 | Tornquist et al. | 252/429 A |
| 3,280,093 | 10/1966 | Coover et al. | 252/429 B X |
| 3,492,281 | 1/1970 | Smith et al. | 252/429 B X |
| 3,850,899 | 11/1974 | Wada et al. | 252/429 B X |
| 4,064,069 | 12/1977 | Ueno et al. | 252/429 B |

*Primary Examiner*—Patrick Garvin
*Attorney, Agent, or Firm*—Keil & Witherspoon

[57] ABSTRACT

A process for the manufacture of a titanium-containing component of a catalyst for the polymerization of monoolefins by the Ziegler-Natta method by milling (a) a particular titanium-containing compound, viz. a titanium trichloride/aluminum trichloride complex and (b) a particular ether with one another, in which process (1) a vibratory ball mill producing a particular milling acceleration is used, (2) the mill is first charged with the titanium-containing compound (a) and may or may not then be run for some time in the absence of diluents, (3) while milling, the ether (b) is added at a particular rate, continuously or in small portions, and in the absence of diluents, thereafter (4) the grist is brought to an elevated temperature, while milling, and is kept at this temperature until from 6 to 85% of the aluminum trichloride originally present in a bonded form in the titanium-containing compound (a) have been eliminated from the said compound (a), after which (5) the product obtained according to (4) is washed with a hydrocarbon and then (6) the product obtained in accordance with (5) is dried and milled for a certain length of time at a low temperature in the absence of a diluent. Polyolefins of high stereoregularity can be obtained in a high specific yield by means of the catalyst component manufactured according to the invention.

10 Claims, No Drawings

MANUFACTURE OF A TITANIUM-CONTAINING COMPONENT FOR CATALYSTS OF THE ZIEGLER-NATTA TYPE

The present invention relates to a process for the manufacture of a titanium-containing component of a catalyst for the homopolymerization and copolymerization of α-monoolefins of 3 to 6 carbon atoms by the Ziegler-Natta method, in which (a) a titanium-containing compound of the general formula $$TiCl_3 \cdot nAlCl_3$$

where n is a number from 0.01 to 1 and (b) an ether which contains a total of from 4 to 30 carbon atoms and has the general formula $$R^1-O-R^2$$

where $R^1$ and $R^2$ are identical or different and each is open-chain alkyl of 1 to 15 carbon atoms, phenyl or alkylphenyl (where alkyl is of 1 to 8 carbon atoms) are milled with one another.

A plurality of processes of this type have been disclosed; in the main, the object of these processes is to obtain titanium-containing components which, after activation with an organoaluminum compound or the like - give catalysts which, when used for polymerizing α-olefins, give high specific yields of poly-α-olefins and/or give poly-α-olefins with a relatively high proportion of stereoregular polymer.

The conventional processes have achieved substantial success. However, it is a certain disadvantage that the correspondong titanium-containing components, when used in catalysts of the Ziegler-Natta type which are employed for the polymerization of α-olefins, either give polymers which have a relatively high stereoregularity (isotacticity) but give only relatively low specific yields of the polymers, or vice versa.

It is an object of the present invention to provide a process of the type defined at the outset by means of which it is possible to obtain titanium-containing components which are free from the above disadvantage, or suffer from it to a substantially reduced degree.

We have found that this object is achieved by working under particular physical milling conditions, bringing the starting materials together in a specific manner, milling them with one another until a particular critical range is reached and after-treating the resulting intermediate of the desired titanium-containing component in a specific manner.

Accordingly, the present invention relates to a process for the manufacture of a titanium-containing component of a catalyst for the homopolymerization and copolymerization of—monoolefins of 3 to 6 carbon atoms by the Ziegler-Natta method, by milling together (a) a titanium-containing compound of the general formula $$TiCl_3 \cdot nAlCl_3$$

where n is a number from 0.01 to 1, especially from 0.1 to 0.4, and (b) an ether which contains a total of from 4 to 30, especially from 6 to 16, carbon atoms and has the general formula $$R^1-O-R^2$$

where $R^1$ and $R^2$ are identical or different and each is open-chain alkyl of 1 to 15 carbon atoms, especially of 3 to 8 carbon atoms, phenyl or alkylphenyl, where alkyl is of 1 to 8 carbon atoms, wherein (1) a vibratory ball mill producing a milling acceleration of from 30 to 80, especially from 45 to 55, m.sec.$^{-2}$ is employed, (2) the mill is first charged with the titanium-containing compound (a), after which it may or may not be operated in the absence of a diluent at from −50° to +100° C., especially from −30° to +50° C., over a period of from 0.5 to 100 hours, especially from 2 to 20 hours, then (3) whilst milling at a grist temperature of from −50° to +80° C., especially from −30° to +60° C., an amount of the ether (b) which corresponds to a molar ratio of aluminum in the titanium-containing compound (a) to ether (b) of from 1:5 to 1:0.05, especially from 1:2 to 1:0.7, is added continuously or at intervals, in the absence of a diluent, at a rate of from 0.01 to 200, especially from 1 to 30, ml/min per 2.5 kg of titanium-containing compound (a), thereafter (4) whilst being milled, the grist is brought to from −10° to +100° C., especially from ±0° to +60° C., and is kept in this temperature range until from 6 to 85%, especially from 15 to 60%, of the aluminum trichloride originally present in a bonded form in the titanium-containing compound (a) has been eliminated from the latter, after which (5) the product obtained in accordance with (4) is washed with at least 0.6 times its amount by weight of a hydrocarbon which is liquid at standard temperature and pressure and boils below 150° C., especially below 100° C., at standard pressure and then (6) the product obtained in accordance with (5) is dried and milled, in the absence of diluents, for a period of from 5 to 60, especially from 10 to 30, minutes at from −50° to +10° C., especially from −30° to −10° C.

The following should be noted with respect to the materials used in the new process.

The titanium-containing compounds (a) having the stated general formula are the relevant conventional compounds, for example those obtainable by co-crystallizing $TiCl_3$ and $AlCl_3$ or reducing $TiCl_4$ by means of aluminum or mixtures of aluminum and titanium. Co-crystallized products of the formula $TiCl_3 \cdot \frac{1}{3}AlCl_3$ are particularly suitable. The appropriate titanium-containing compounds (a) are commercially available, so that more detailed comments are superfluous.

Suitable ethers (b) having the stated general formula are again the relevant conventional compounds conforming to this formula, especially those where $R^1$ and $R^2$ are methyl, ethyl, propyl, butyl, amyl, hexyl or phenyl. Examples of suitable compounds of this nature are described in U.S. Pat. No. 3,116,274.

Specific examples of very suitable ethers (b) are di-n-propyl ether, di-n-butyl ether, di-n-amyl ether, di-isoamyl ether and di-n-hexyl ether, as well as methyl phenyl ether and ethyl phenyl ether.

Particularly suitable ethers (b) are di-n-butyl ether, di-isoamyl ether and methyl phenyl ether.

The liquid hydrocarbon to be used in step (5) can be a hydrocarbon of the type which is conventionally brought into contact with titanium-containing components for catalysts of the Ziegler-Natta type, without detriment to the catalyst or to its titanium-containing component, for example in the polymerization of α-monoolefins. Examples of suitable hydrocarbons are pentanes, hexanes, heptanes, gasolines and cyclohexane.

The process according to the invention is very simple to carry out and does not require any explanation to those skilled in the art. At most, what requires mention is that the degree of partial elimination of the aluminum chloride from the titanium-containing compound (a), which degree is critical in step (4), can easily be ascertained by taking a sample of the grist periodically, washing it—for example with the hydrocarbon to be used in step (5)—and drying it, and analyzing the resulting solid.

The titanium-containing components for catalysts of the Ziegler-Natta type, manufactured by the process of the invention, can be employed in the relevant conventional manner in the polymerization of α-olefins, i.e. these titanium components are in general used together with an organo-metallic activator, especially with an aluminum-alkyl compound of the formula Al(alkyl)$_3$ or ClAl(alkyl)$_2$, where alkyl is of one to eight carbon atoms, and above all together with triethyl-aluminum or diethyl-aluminum chloride.

Particularly good results are obtained in the dry polymerization of α-olefins, i.e. the polymerization in the absence of liquid auxiliary media; however, polymerization in the presence of such media can also be carried out with good success. The molecular weight can be adjusted by means of the conventional regulators, especially hydrogen. Suitable α-olefins to polymerize are those of three to six carbon atoms, especially propylene, 1-butene and 4-methyl-1-pentene.

EXAMPLE 1

Manufacture of the titanium-containing component

The starting compounds are (a) a titanium compound of the formula TiCl$_3$.⅓AlCl$_3$ and (b) di-n-butyl ether.

Milling is carried out in a vibratory ball mill having a useful volume of 10 liters.

In other respects the procedure followed is that:

(1) the mill is operated with a milling acceleration of 51 m.sec$^{-2}$, (2) the mill is initially charged with 2.6 kg of the titanium-containing compound (a) and is operated in the absence of diluents at +15° C. for a period of 15 hours, then (3) whilst milling at a grist temperature of −25° C., the amount of ether (b) which corresponds to a molar ratio of aluminum in the titanium-containing compound (a) to ether (b) of 1:0.33 is added continuously at a rate of 2.5 ml/min per 2.5 kg of titanium-containing compound (a), in the absence of diluents, thereafter (4) whilst milling, the grist is brought to +30° C. and is kept near this temperature until 27% of the aluminum trichloride originally present in a bonded form in the titanium-containing compound (a) has been eliminated from the said compound, after which (5) the product obtained in accordance with (4) is washed with 1.8 times its amount by weight of hexane, and then (6) the product obtained in accordance with (5) is dried under argon and is milled for a period of 10 minutes at −25° C. in the absence of diluents.

Polymerization by means of the titanium-containing component 1.13 grams of the titanium-containing component and 1.5 grams of diethyl-aluminum chloride are introduced into a 2 liter stirred flask which is charged with 1.5 liters of dry heptane. The polymerization is then carried out for a period of 5 hours whilst stirring, under a propylene pressure of 1 bar at 60° C., the pressure and temperature being regulated to keep them constant; thereafter the polymerization is stopped by adding 20 ml of methanol and the suspension medium is removed by distillation.

215 g of polypropylene are obtained, corresponding to a productivity of 270 parts by weight of polypropylene per part by weight of titanium-containing compound (a), calculated as TiCl$_3$. The polypropylene contains 1.7 percent by weight of material soluble in boiling n-heptane.

EXAMPLE 2

Manufacture of the titanium-containing component

The starting compounds are (a) a titanium compound of the formula TiCl$_3$.⅓AlCl$_3$ (commercial finely milled material) and (b) di-isoamyl ether.

Milling is carried out in a vibratory ball mill having a useful volume of 10 liters.

In other respects the procedure followed is that:

(1) the mill is operated with a milling acceleration of 45 m.sec$^{-2}$, (2) the mill is initially charged with 2.6 kg of the titanium-containing compound (a), then (3) whilst milling at a grist temperature of −30° C., the amount of the ether (b) which corresponds to a molar ratio of aluminum in the titanium-containing compound (a) to ether (b) of 1:0.33 is added in discrete portions at a rate of 2.5 ml/min per 2.5 kg of titanium-containing compound (a) in the absence of diluents, thereafter (4) whilst milling, the grist is brought to +20° C. and is kept near this temperature until 45% of the aluminum trichloride originally present in a bonded form in the titanium-containing compound (a) has been eliminated from the said compound, after which (5) the product obtained in accordance with (4) is washed with 1.1 times its amount by weight of n-pentane, and then (6) the product obtained in accordance with (5) is dried and is milled for a period of 15 minutes at −30° C. in the absence of diluents.

Polymerization by means of the titanium-containing component

The process is carried out using a stirred reactor of 0.8 m$^3$ capacity, under a propylene pressure of 28 bars, which is maintained continuously by a regulating system, and using an amount of hydrogen of 85 liters (S.T.P.)/h, at a reaction temperature of 70° C., regulated continuously to keep it constant, and in the absence of solvents and diluents, in a bed of 280 kg of small particles of propylene polymer. The reactor is operated continuously, with 10.0 g/h of the titanium-containing component and 37.4 g/h of (C$_2$H$_5$)$_2$AlCl being introduced separately from one another.

The reactor produces polypropylene in the form of small particles, of average size about 0.25 mm; this product contains 29 ppm, by weight, of titanium and 5.4% by weight of material soluble is boiling n-heptane, and has an intrinsic viscosity of 2.7[dl/g].

We claim:

1. A process for the manufacture of a titanium-containing component of a catalyst for the homopolymerization and copolymerization of α-monoolefins of 3 to 6 carbon atoms by the Ziegler-Natta method, by milling together
   (a) a titanium-containing compound of the general formula $TiCl_3 \cdot nAlCl_3$ where n is a number of 0.01 to 1, and
   (b) an ether which contains a total of from 4 to 30 carbon atoms and has the general formula $R^1-O-R^2$ where $R^1$ and $R^2$ are identical or different and each is open-chain alkyl of 1 to 15 carbon atoms, phenyl or alkylphenyl, where alkyl is of 1 to 8 carbon atoms, wherein
   (1) a vibratory ball mill producing a milling acceleration of from 30 to 80 m.sec.$^{-2}$ is employed,
   (2) the mill is first charged with the titanium-containing compound (a), after which it may or may not be operated in the absence of a diluent at from $-50°$ to $+100°$ C. over a period of from 0.5 to 100 hours, then
   (3) whilst milling at a grist temperature of from $-50°$ to $+80°$ C., an amount of the ether (b) which corresponds to a molar ratio of aluminum in the titanium-containing compound (a) to ether (b) of from 1:5 to 1:0.05 is added continuously or at intervals, in the absence of a diluent, at a rate of from 0.01 to 200 ml/min per 2.5 kg of titanium-containing compound (a), thereafter
   (4) whilst being milled, the grist is brought to from $-10°$ to $+100°$ C. and is kept in this temperature range until from 6 to 85% of the aluminum trichloride originally present in a bonded form in the titanium-containing compound (a) has been eliminated from the latter, after which
   (5) the product obtained in accordance with (4) is washed with at least 0.6 times its amount by weight of a hydrocarbon which is liquid at standard temperature and pressure and boils below 150° C. at standard pressure, and then
   (6) the product obtained in accordance with (5) is dried and milled, in the absence of diluents, for a period of from 5 to 60 minutes at from $-50°$ to $+10°$ C.

2. The process of claim 1, wherein a vibratory ball mill providing a milling acceleration of 45 to 55 m.sec$^{-2}$ is employed.

3. The process of claim 1, wherein the vibratory ball mill is operated in the absence of a diluent at fom $-30°$ to $+50°$ C., over a period of from 2 to 20 hours in step (2).

4. The process of claim 1, wherein, while milling at a grist temperature of from $-30°$ to $+60°$ C., an amount of the ether (b) which corresponds to a molar ratio of aluminum in the titanium-containing compound (a) to ether (b) of from 1:2 to 1:0.7 is added at a rate of from 1 to 30 ml/min per 2.5 kg of titanium-containing compound (a) in step (3).

5. The process of claim 1, wherein, while being milled in step (4), the grist is brought to from 0° to $+60°$ C. and is kept at this temperature range until from 15 to 60% of the aluminum trichloride originally present in a bonded form in the titanium-containing compound (a) has been eliminated from the latter.

6. A process as claimed in claim 1, wherein the liquid hydrocarbon used in step (5) boils below 100° C. at standard pressure.

7. A process as claimed in claim 1, wherein the product is milled in step (6) for a period of from 10 to 30 minutes at from $-30°$ to $-10°$ C.

8. A process as claimed in claim 1, wherein, for the titanium-containing compound (a), n is a number from 0.1 to 0.4.

9. A process as claimed in claim 1, wherein the ether (b) has a total of from 6 to 16 carbon atoms.

10. A process as claimed in claim 1, wherein, for the ether (b), $R^1$ and $R^2$, which are identical or different, are alkyl of 3 to 8 carbon atoms, phenyl or alkylphenyl, where alkyl is of up to 8 carbon atoms.

* * * * *